(12) United States Patent
Youn et al.

(10) Patent No.: US 8,116,636 B2
(45) Date of Patent: Feb. 14, 2012

(54) TRANSCEIVER AND METHOD FOR HIGH-SPEED AUTO-COMPENSATING QUANTUM CRYPTOGRAPHY

(75) Inventors: Chun Ju Youn, Daejeon (KR); Tae Gon Noh, Daejeon (KR); Jong Cheol Hong, Daejeon (KR); Heon Oh Kim, Gyeongju (KR); Taehyoung Zyung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 824 days.

(21) Appl. No.: 12/096,609

(22) PCT Filed: Dec. 6, 2006

(86) PCT No.: PCT/KR2006/005243
§ 371 (c)(1),
(2), (4) Date: Jun. 8, 2008

(87) PCT Pub. No.: WO2007/066978
PCT Pub. Date: Jun. 14, 2007

(65) Prior Publication Data
US 2008/0260393 A1 Oct. 23, 2008

(30) Foreign Application Priority Data

Dec. 8, 2005 (KR) .................. 10-2005-0119463
Apr. 5, 2006 (KR) .................. 10-2006-0030954

(51) Int. Cl.
*H04B 10/04* (2006.01)
(52) U.S. Cl. .................. 398/188; 398/198; 398/152

(58) Field of Classification Search .................. 398/152, 398/140, 141, 142, 151, 201, 202, 214, 188, 398/198, 207, 205, 183
See application file for complete search history.

(56) References Cited

U.S. PATENT DOCUMENTS

| 6,188,768 | B1 | 2/2001 | Bethune et al. |
|---|---|---|---|
| 6,438,234 | B1 | 8/2002 | Gisin et al. |
| 2004/0005056 | A1 | 1/2004 | Nishioka et al. |
| 2004/0161109 | A1 | 8/2004 | Trifonov |
| 2005/0078827 | A1 | 4/2005 | Tajima |
| 2006/0018658 | A1* | 1/2006 | Mori .................. 398/79 |

OTHER PUBLICATIONS

Ribordy et al., "Automated 'plug and play' quantum key distribution", Electronics Letters, vol. 34, No. 22, Oct. 29, 1998, pp. 2116-2117.
Zbinden et al., "Interferometry with Faraday mirrors for quantum cryptography", Electronics Letters, vol. 33, No. 7, Mar. 27, 1997, pp. 586-588.

* cited by examiner

*Primary Examiner* — M. R. Sedighian
(74) *Attorney, Agent, or Firm* — Rabin & Berdo, P.C.

(57) ABSTRACT

Provided are an auto-compensating quantum cryptography transceiver and method of transmitting a quantum cryptography key at a high speed. A quantum cryptography transmitter includes a wavelength converter, an optical attenuator, an optical phase modulator, and a Faraday mirror. A quantum cryptography receiver includes a polarization beam splitter, an optical coupler, an optical filter, and a photon detector. Thus, a limit of a transmission rate caused by Rayleigh scattering of an optical fiber can be overcome.

9 Claims, 4 Drawing Sheets

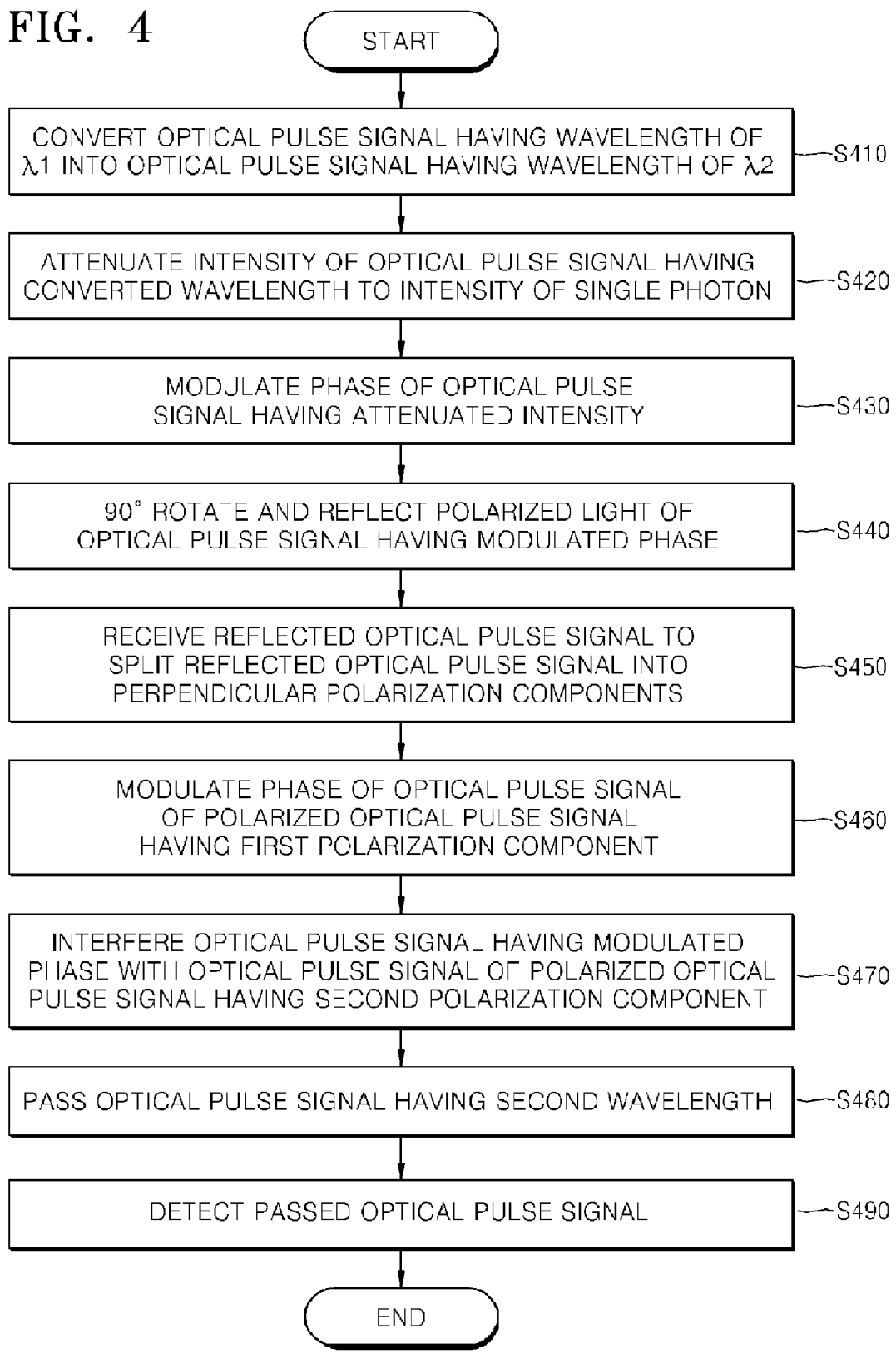

TRANSCEIVER AND METHOD FOR HIGH-SPEED AUTO-COMPENSATING QUANTUM CRYPTOGRAPHY

TECHNICAL FIELD

The present invention relates to a transceiver and a method for communicating in quantum cryptography, and more particularly, to a transceiver and a method for overcoming an effect of Rayleigh scattering of an optical fiber and increasing a transmission rate in optical fiber-based auto-compensating quantum cryptography technology.

BACKGROUND ART

With the sudden popularity of the Internet, many important tasks involving financial transactions, information exchange, etc, are performed in a computer network. Security when communicating in computer networks is a major concern that has to be attended to.

As such, cryptography allows only a specific group to share information and prohibits other parties other than the specific group communicating to access the contents of the information so as to secure communication. To achieve such an objective, cryptography must be accurately deciphered by the group using cryptography as a security measure while not allowing the information to be deciphered by a third party.

Presently, public key cryptographic technology such as Rivest, Shamir, Adleman (RSA) technology is mainly being used. However, most currently used cryptography methods, such as RSA technology, do not strictly provide security since such technologies are based on conditional security that is substantially difficult to be solved. As computer technology, quantum computers, and a new and effective algorithm are developing, cryptography is solved.

A quantum cryptography method of ensuring security using a quantum-mechanical characteristic of light has been recently developed as a method of solving this problem.

A quantum cryptography is a cryptographic system that fundamentally prevents wiretapping from occurring during an exchange of cryptography keys since quantum cryptography is based on quantum physics.

Since a person communicating can use quantum cryptography to tell if the line is being tapped, quantum cryptography can be utilized to ensure a secure communication A physical natural phenomenon, but not a mathematical technique, is used as a system to prevent tapping since converting a signal during a communication session is useless. Thus, a method of tapping quantum cryptography does not originally exist.

A basic system for realizing quantum cryptography uses a linear polarization photon as a principle.

An optical fiber-based quantum cryptography system has been developed in technology for actively compensating polarization and phase (or path) fluctuation of an optical signal occurring during a transmission of an optical signal through a transmission optical fiber. Thus, auto-compensating quantum cryptography technology for passively compensating polarization and path fluctuation using a Faraday mirror has been invented by the Gisin faculty et al. in the Swiss Geneva University.

In an auto-compensating quantum cryptography system, an optical pulse signal having a strong intensity transmitted from a quantum cryptography receiver Bob to a quantum cryptography transmitter Alice meets a pulse with an intensity of a single photon being fed back from the quantum cryptography transmitter to the quantum cryptography receiver in a transmission optical fiber.

DISCLOSURE OF INVENTION

Technical Problem

In this case, the transmitted pulses with strong intensity is reflected due to Rayleigh scattering of the transmission optical fiber, and thus, detected together at the same time with the fed back pulse from the quantum cryptography transmitter Alice to the quantum cryptography receiver Bob by a quantum detector of the quantum cryptography receiver resulting in a transmission error. Accordingly, in the auto-compensating quantum cryptography system, only one optical pulse must exist in the transmission optical fiber to not be affected by Rayleigh scattering. As a result, the transmission rate of the auto-compensating quantum cryptography system is limited and affected.

Technical Solution

The present invention provides a quantum cryptography transceiver and method for overcoming a limit of a transmission rate caused by Rayleigh scattering occurring in an optical fiber in an auto-compensating quantum cryptography system.

Advantageous Effects

As described above, a high-speed auto-compensating quantum cryptography system according to the present invention can include a quantum cryptography transmitter including a wavelength converter and a quantum cryptography receiver including an optical filter removing an optical pulse signal caused by Rayleigh scattering. Thus, a limit of a transmission rate caused by the Rayleight scattering of an optical fiber can be overcome.

DESCRIPTION OF DRAWINGS

The above and other features and advantages of the present invention will become more apparent by describing in detail exemplary embodiments thereof with reference to the attached drawings in which:

FIG. 4 illustrates a flowchart of an auto-compensating quantum cryptography communicating method of improving a transmission rate according to an embodiment of the present invention.

BEST MODE

Figure 1:
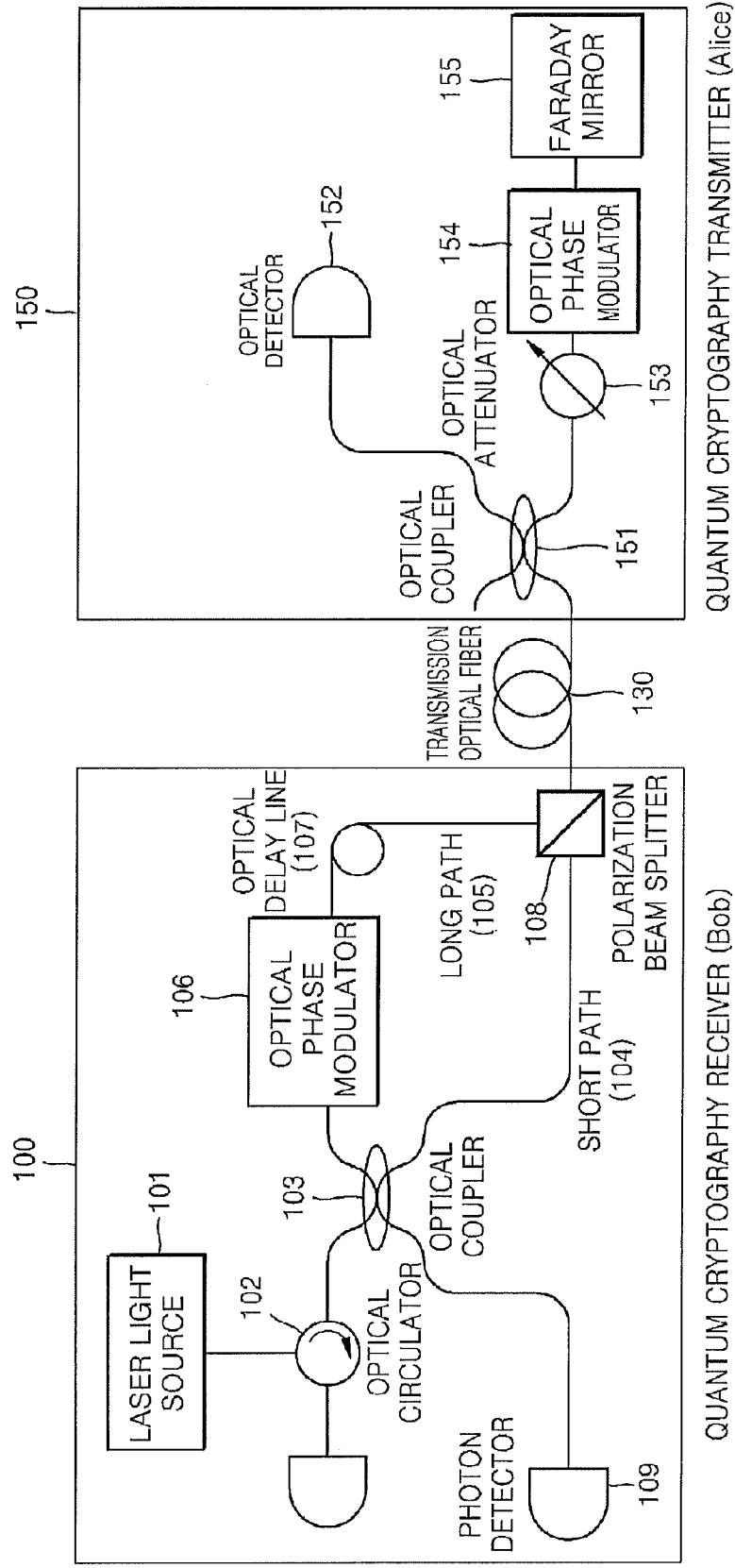
FIG. 1 is a view illustrating a configuration of an auto-compensating quantum cryptography system according to an embodiment of the previous (or prior) invention.

According to an aspect of the present invention, there is provided a quantum cryptography transmitter including: a wavelength converter converting an optical pulse signal having a first wavelength into an optical pulse signal having a second wavelength; an optical attenuator attenuating an intensity of the optical pulse signal having the second wavelength; an optical phase modulator modulating a phase of the optical pulse signal having the attenuated intensity; and a Faraday mirror rotating and reflecting polarized light of the optical pulse signal having the modulated phase.

According to another aspect of the present invention, there is provided a quantum cryptography transmitter including: an optical phase modulator modulating a phase of an optical pulse signal having a first wavelength; a Faraday mirror rotating and reflecting polarized light of the optical pulse signal having the modulated phase; a wavelength converter converting the reflected optical pulse signal having a first wavelength into an optical pulse signal having a second wavelength; and an optical attenuator attenuating an intensity of the optical pulse signal having the second wavelength.

According to another aspect of the present invention, there is provided a quantum cryptography receiver including: a polarization beam splitter splitting a received optical pulse signal into perpendicular polarization components; an optical phase modulator modulating a phase of an optical pulse signal of the polarized optical pulse signals having a first polarization component; an optical coupler interfering the optical pulse signal having the modulated phase with an optical pulse signal of the polarized optical pulse signals having a second polarization component; an optical filter passing only a predetermined wavelength of the interfered signals; and a photon detector detecting a signal output from the optical filter.

According to another aspect of the present invention, there is provided a quantum cryptography communicating method including: converting an optical pulse signal having a first wavelength into an optical pulse signal having a second wavelength; attenuating an intensity of the optical pulse signal having the second wavelength; modulating a phase of the optical pulse signal having the attenuated intensity and rotating and reflecting polarized light of the optical pulse signal having the modulated phase; receiving the reflected optical pulse signal to split the reflected optical pulse signal into perpendicular polarization components; modulating a phase of an optical pulse signal of the polarized optical pulse signal having a first polarization components; interfering the optical pulse signal having the modulated phase with an optical pulse signal of the polarized optical pulse signal having a second polarization component; passing the optical pulse signal of the interfered signals having the second wavelength; and detecting a photon of the passed optical pulse signal.

MODE FOR INVENTION

Hereinafter, preferred embodiments of the present invention will be described with reference to the attached drawings.

FIG. 1 is a view illustrating a configuration of an auto-compensating quantum cryptography system according to an embodiment of the previous (or prior) invention.

The auto-compensating quantum cryptography system is a two-way communication system feeding back an optical signal from a quantum cryptography receiver to a quantum cryptography transmitter, then back to the quantum cryptography receiver, so as to detect a quantum signal.

In more detail, a quantum cryptography receiver 100 generates an optical pulse through a laser light source 101, and the optical pulse passes through an optical circulator 102 and is split into two optical pulses, i.e., an optical pulse advancing through a short path 104 and an optical pulse advancing through a long path 105, by an optical coupler 103.

The optical pulse advancing through the long path 105 is input to a polarization beam splitter 108 through an optical phase modulator 106 and an optical delay line 107, and then output to a transmission optical fiber 130.

The optical pulse advancing through the short path 104 is directly input to the polarization beam splitter 108 (after 90° polarization rotation with respect to long path, is not shown in FIG. 1), and then output to the transmission optical fiber 130.

In the previous (or prior) embodiment, the optical pulse advancing through the long path 105 is delayed more than the optical pulse advancing through the short path 104, and thus, two temporarily split optical pulses are output to the transmission optical fiber 130.

Also, the two optical pulses having polarization components perpendicular to each other are output to the transmission optical fiber 130 by the polarization beam splitter 108.

An optical coupler 151 of a quantum cryptography transmitter 150 splits the intensity of optical pulses, which passed through the transmission optical fiber 130, to certain scale.

An output port of the optical coupler 151 of a quantum cryptography transmitter 150 is connected to an optical detector 152 to supply a timing signal, so that a phase of an optical pulse output from the other output port of the optical coupler 151 of a quantum cryptography transmitter 150 is modulated by an optical phase modulator 154 during a pass of the optical pulse.

The optical pulse output from the other output port of the optical coupler 151 of a quantum cryptography transmitter 150 is input to a Faraday mirror 155 after passing through the optical phase modulator 154.

The Faraday mirror 155 reflects an input optical pulse of transverse electric (TE) polarized light as an optical pulse of transverse magnetic (TM) polarization light and reflects an input optical pulse of the TM polarized light as an optical pulse of the TE polarized light.

The intensity of the reflected optical pulse is attenuated to a quantum level (an average number of photons per pulse is about 0.1) using an optical attenuator 153, and then the reflected optical pulse is re-transmitted to the transmission optical fiber 130.

The optical pulses having passed through the transmission optical fiber 130 are input to the polarization beam splitter 108 of the quantum cryptography receiver 100, pass through the optical coupler 103 or the optical circulator 102, and are detected by a photon detector 109 through a different path from the path through which the optical pulses first advanced.

In other words, the optical pulse transmitted through the long path 105 to the quantum cryptography transmitter 150 passes through the optical coupler 103 or the optical circulator 102 through the short path 104 in return path and is detected by the photon detector 109. The optical pulse passed through the short path 104 directly to the polarized beam splitter 108 passes through the optical coupler 103 or the optical circulator 102 through the long path 105 in return path and is detected by the photon detector 109.

In an auto-compensating quantum cryptography system, an input optical pulse is reflected with 90° polarization rotation by a Faraday mirror. Thus, a birefringence of a transmission optical fiber can be automatically compensated for, and lengths of the interference paths of optical pulses become automatically the same because optical pulses pass through the transmission optical fiber by two-way transmission with 90° polarization rotation.

Figure 2:
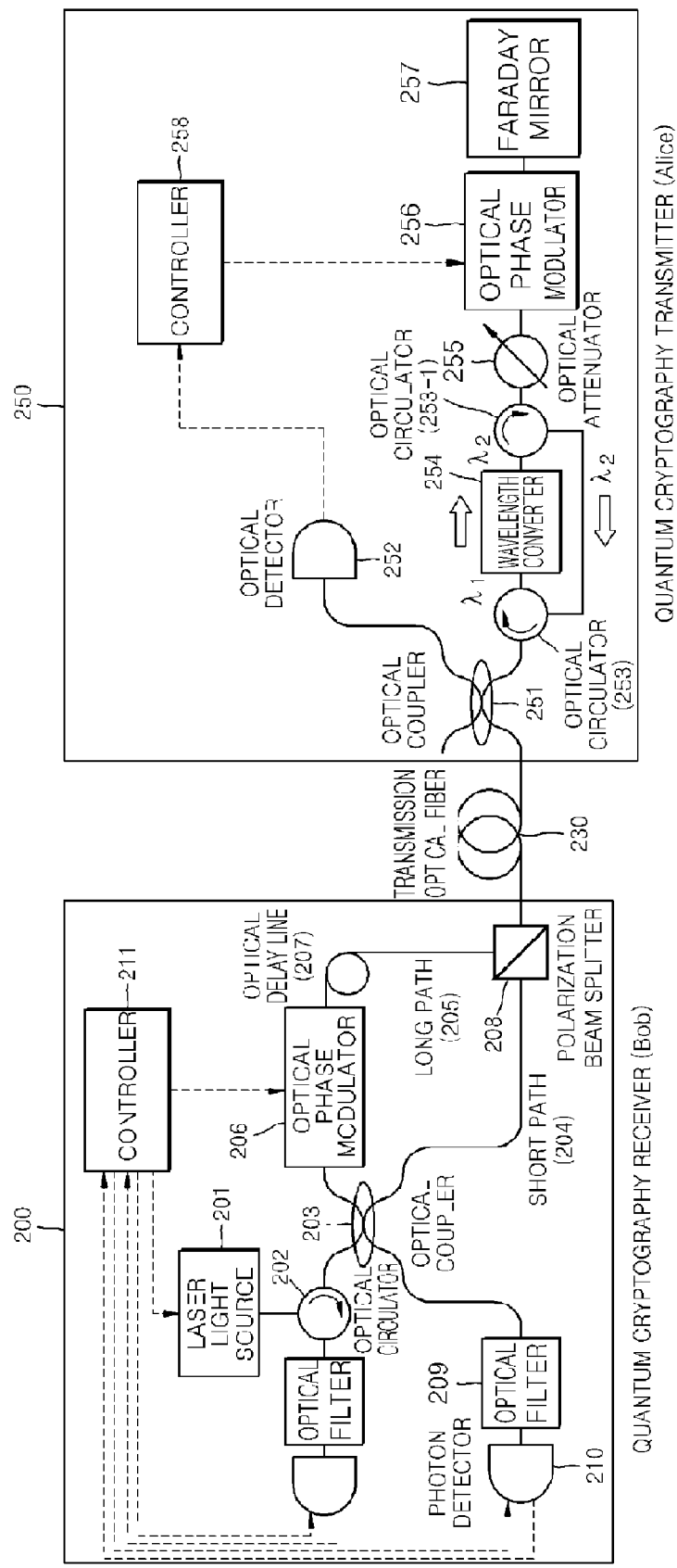
FIG. 2 is a view illustrating a configuration of an auto-compensating quantum cryptography transceiver for improving a transmission rate according to an embodiment of the present invention.

FIG. 2 is a view illustrating a configuration of an auto-compensating quantum cryptography transceiver for improving a transmission rate according to an embodiment of the present invention.

The core of the present embodiment will now be described in order to overcome a limit of a transmission rate caused by Rayleigh scattering of an optical fiber as the most basic problem of an auto-compensating quantum cryptography system using a two-way transmission in a transmission optical fiber, the auto-compensating quantum cryptography system includes a quantum cryptography transmitter 250 including a wavelength converter 254 and a quantum cryptography receiver 200 including an optical filter 209. Thus, a transmission wavelength of an optical pulse signal advancing through a path from the quantum cryptography receiver 200 to the quantum cryptography transmitter 250 is different from a transmission wavelength of a single photon advancing through a path from the quantum cryptography transmitter 250 to the quantum cryptography receiver 200.

The quantum cryptography transmitter 250 receives a strong optical transmission pulse signal $\lambda 1$ having a polarization component in a specific direction generated by the quantum cryptography receiver 200 through a transmission optical fiber 230.

An optical coupler 251 of the quantum cryptography transmitter 250 splits the intensity of optical pulses, which passed through the transmission optical fiber 230, to certain scale.

An output port of the optical coupler 251 of a quantum cryptography transmitter 250 is connected to an optical detector 252 to supply a timing signal, so that a phase of an optical pulse signal output from the other output port of the optical coupler 251 is modulated when the optical pulse signal passes through an optical phase modulator 256.

A controller detects a pulse from an output of the optical detector 252 and provides a synchronized phase modulation signal to the optical phase modulator 256 when an optical pulse signal passes through the optical phase modulator 256.

The optical pulse signal having a wavelength of $\lambda 1$ output from the other output port of the optical coupler 251 is converted into an optical pulse signal with a wavelength of $\lambda 2$ by a wavelength converter 254.

An optical attenuator 255 attenuates an intensity (an average number of photons per pulse is 0.1) of the optical pulse signal having the wavelength of $\lambda 2$ to generate a quantum cryptography key.

The optical phase modulator 256 modulates a phase of a signal output from the optical attenuator 255.

Optical pulse output from the optical phase modulator 256 is reflected from a Faraday mirror 257 and its polarization is rotated by 90°.

Optical circulators 253 and 253-1 transmit the reflected optical pulse signal with the wavelength of $\lambda 2$ to the quantum cryptography receiver 200 through the transmission optical fiber 230 through a different path from the path through which the optical pulse signal having the wavelength of $\lambda 1$ passed.

The quantum cryptography receiver 200 receives the optical pulse signal having the wavelength of $\lambda 2$ from the transmission optical fiber 230, and a polarization beam splitter 208 splits a transmission path of the optical pulse signal having the wavelength $\lambda 2$ depending on a polarization state of the optical pulse signal having the wavelength of $\lambda 2$.

An optical phase modulator 206 modulates the phase of optical pulse signal passed through a long path 205 by the polarization beam splitter 208.

The optical pulse signal with the modulated phase advancing through the long path 205 interferes with an optical pulse signal split by the polarization beam splitter 208 and transmitted through a short path 204 in the optical coupler 203 of a quantum cryptography receiver 200.

An optical pulse signal output from the optical coupler 203 passes through an optical filter 209 passing the optical pulse signal having the wavelength of $\lambda 2$ converted in the quantum cryptography transmitter 250, and a photon of the optical pulse signal is detected by a photon detector 210, so as to achieve two-way transmission.

Figure 3:
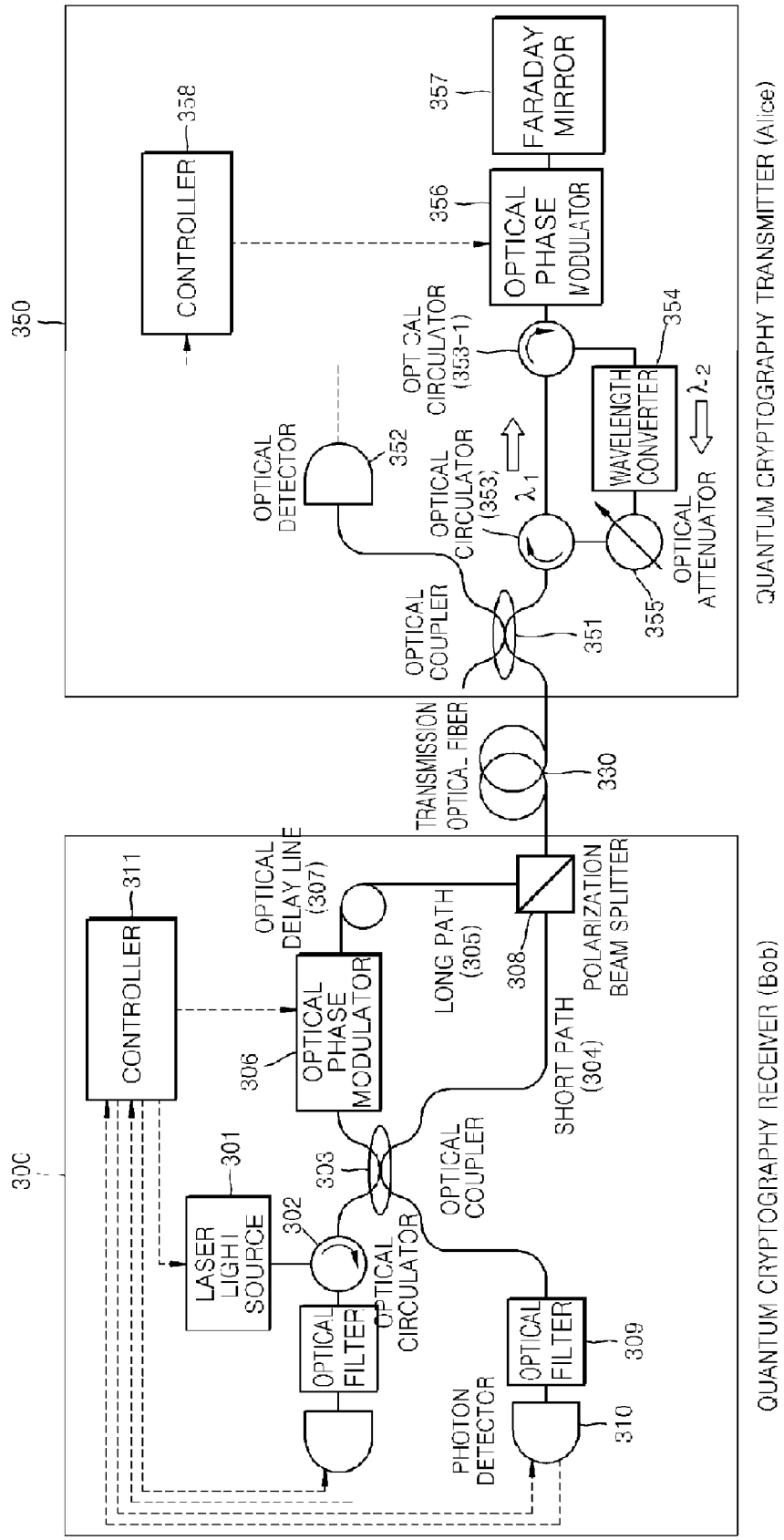
FIG. 3 is a view illustrating a configuration of an auto-compensating quantum cryptography transceiver for improving a transmission rate according to another embodiment of the present invention.

FIG. 3 is a view illustrating a configuration of an auto-compensating quantum cryptography transceiver for improving a transmission rate according to another embodiment of the present invention The present invention is characterized in that a position of a wavelength converter depends on a path through which polarized light is rotated 90° by a Faraday mirror, and then transmitted to a quantum cryptography receiver 300.

The quantum cryptography receiver 300 shown in FIG. 3 performs the same function as the quantum cryptography receiver 200 shown in FIG. 2.

In other words, a quantum cryptography receiver 300 includes an optical filter 309 passing a photon having a converted wavelength in a quantum cryptography transmitter 350 to be detected, so as to overcome a limit of a transmission rate caused by Rayleigh scattering.

The quantum cryptography transmitter 350 receives a strong optical pulse signal having a wavelength of $\lambda 1$ with a polarization component in a specific direction generated by the quantum cryptography receiver 300 through a transmission optical fiber 330.

An optical coupler 351 of the quantum cryptography transmitter 350 splits the intensity of optical pulses, which passed through the transmission optical fiber 330, to certain scale.

An output port of the optical coupler 351 is connected to an optical detector 352 to supply a timing signal so that a phase of an optical pulse signal output from the other output port of the optical coupler 351 is modulated during a pass of the optical pulse signal through an optical phase modulator 356.

A controller detects a pulse from an output of the optical detector 352, provides synchronized phase modulation signal to the optical phase modulator 356 when an optical pulse signal passes through the optical phase modulator 356.

An optical pulse signal with a wavelength of $\lambda 1$ output from the other output port of the optical coupler 351 is input to the optical phase modulator 356 through optical circulators 353 and 353-1.

The optical phase modulator 356 modulates a phase of a signal output from an optical attenuator 355.

Optical pulse output from the optical phase modulator 356 is reflected from a Faraday mirror 357 and its polarization is rotated by 90°.

The reflected optical signal having the wavelength of $\lambda 1$ is input to a wavelength converter 354 through a different path from the path through which the optical pulse signal is input to the optical circulator 353-1.

The wavelength converter 354 converts the optical pulse signal having the wavelength of $\lambda 1$ into an optical pulse signal having a wavelength of $\lambda 2$.

The optical attenuator 355 attenuates the intensity (an average number of photons per pulse is about 0.1) of the optical pulse signal having the wavelength of $\lambda 2$ to generate a quantum cryptography key.

A single photon signal is output to the optical coupler 351 through the optical circulator 353 and then transmitted to the quantum cryptography receiver 300 through a transmission optical fiber 330.

FIG. 4 is a flowchart of an auto-compensating quantum cryptography communicating method of improving a transmission rate according to an embodiment of the present invention.

In operation S410, a wavelength converter converts an optical pulse signal having a wavelength of $\lambda 1$ into an optical pulse signal having a wavelength of $\lambda 2$.

In operation S420, an optical attenuator attenuates an intensity of the optical pulse signal having the converted wavelength to an intensity of a single photon.

In operation S430, an optical phase modulator modulates a phase of the optical pulse signal having the attenuated intensity.

In operation S440, a Faraday mirror rotates the polarization of optical pulse signal by 90° and reflects polarized light of the optical pulse signal.

In operation S450, a polarization beam splitter of a quantum cryptography receiver receives the reflected optical pulse signal to split the reflected optical pulse signal into perpendicular polarization components.

In operation S460, an optical phase modulator modulates a phase of an optical pulse signal of the polarized optical signals having a first polarization component.

In operation S470, the optical pulse signal having the modulated phase interferes with an optical pulse signal of the polarized optical pulse signals having a second polarization component in the optical coupler.

In operation S480, an optical filter functioning as a band pass filter passes an optical pulse signal of the interfered signals having a second wavelength.

In operation S490, an optical detector detects a signal output from the optical filter.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A quantum cryptography transmitter comprising:
    a wavelength converter converting an optical pulse signal having a first wavelength into an optical pulse signal having a second wavelength;
    an optical attenuator attenuating an intensity of the optical pulse signal having the second wavelength;
    an optical phase modulator modulating a phase of the optical pulse signal having the attenuated intensity;
    a Faraday mirror rotating the polarization of the optical pulse signal having the modulated phase and reflecting polarized light of the optical pulse signal having the modulated phase as a reflected optical pulse signal;
    an optical coupler splitting an intensity of the optical pulse signal having the first wavelength into split optical pulse signals;
    an optical detector detecting an optical pulse signal from one of the split optical pulse signals;
    a controller receiving an output of the optical detector and transmitting a synchronized phase modulation signal to the optical phase modulator;
    a first optical circulator positioned before the wavelength converter, passing one of the split optical pulse signals from the optical coupler to the wavelength converter, and feeding the optical pulse signal having the second wavelength reflected from the Faraday mirror back to the optical coupler; and
    a second optical circulator positioned after the wavelength converter, passing the optical pulse signal having the second wavelength to the optical attenuator, and feeding the optical pulse signal having the second wavelength reflected from the Faraday minor back to the first optical circulator.

2. The quantum cryptography transmitter of claim 1, wherein the optical pulse signal having the first wavelength comprises a polarization component in a specific direction.

3. The quantum cryptography transmitter of claim 1, wherein the optical pulse signal having the attenuated intensity has an intensity of a single photon.

4. A quantum cryptography transmitter comprising:
    an optical phase modulator modulating a phase of an optical pulse signal having a first wavelength;
    a Faraday mirror rotating the polarization of the optical pulse signal having the modulated phase and reflecting polarized light of the optical pulse signal having the modulated phase as a reflected optical pulse signal;
    a wavelength converter converting the reflected optical pulse signal having the first wavelength into an optical pulse signal having a second wavelength;
    an optical attenuator attenuating an intensity of the optical pulse signal having the second wavelength;
    an optical coupler splitting an intensity of the optical pulse signal having the first wavelength into split optical pulse signals;
    an optical detector detecting an optical pulse signal from one of the split optical pulse signals;
    a controller receiving an output of the optical detector and transmitting a synchronized phase modulation signal to the optical phase modulator; and
    a first optical circulator and a second optical circulator,
        the first optical circulator passing one of the split optical pulse signals from the optical coupler to the second optical circulator, and feeding the optical pulse signal having the attenuated intensity and the second wavelength back to the optical coupler, and
        the second optical circulator being positioned before the optical phase modulator passing the optical pulse signal having the first wavelength from the first optical circulator to the optical phase modulator, and inputting the optical pulse signal having the first wavelength reflected from the Faraday mirror to the wavelength converter.

5. The quantum cryptography transmitter of claim 4, wherein the optical pulse signal having the first wavelength comprises a polarization component in a specific direction.

6. The quantum cryptography transmitter of claim 4, wherein the optical pulse signal having the attenuated intensity has an intensity of a single photon.

7. A quantum cryptography communicating method comprising:
    using an optical coupler, splitting an intensity of an optical pulse signal having a first wavelength into split optical pulse signals;
    detecting an optical pulse signal from one of the split optical pulse signals;
    transmitting a synchronized phase modulation signal based in part upon the detected optical pulse signal;
    using a wavelength converter, converting another one of the split optical pulse signals into an optical pulse signal having a second wavelength;

using an optical attenuator, attenuating an intensity of the optical pulse signal having the second wavelength;

modulating a phase of the optical pulse signal having the attenuated intensity based in part upon the synchronized phase modulation signal;

rotating the polarization of the optical pulse signal having the modulated phase and reflecting polarized light of the optical pulse signal having the modulated phase as a reflected optical pulse signal;

using a first optical circulator positioned before the wavelength converter, passing the another one of the split optical pulse signals from the optical coupler to the wavelength converter, and feeding the reflected optical pulse signal back to the optical coupler; and using a second optical circulator positioned after the wavelength converter, passing the optical pulse signal from the wavelength converter having the second wavelength to the optical attenuator, and feeding the reflected optical pulse signal back to the first optical circulator.

8. The quantum cryptography communicating method of claim 7, wherein the optical pulse signal having the attenuated intensity has an intensity of a single photon.

9. The quantum cryptography communicating method of claim 7, further comprising:

receiving the reflected optical pulse signal from the optical coupler to split an intensity of the reflected optical pulse signal into perpendicular polarization components;

modulating a phase of an optical pulse signal of the perpendicular polarized optical pulse signals having a first polarization component;

interfering the optical pulse signal having the modulated phase and the first polarization component with an optical pulse signal of the perpendicular polarized optical pulse signals having a second polarization component;

passing the optical pulse signal of the interfered signals; and detecting a photon of the passed and interfered optical pulse signal.

* * * * *